(12) United States Patent
Asaoka (10) Patent No.: US 7,637,731 B2
(45) Date of Patent: Dec. 29, 2009

(54) HONEYCOMB STRUCTURE BODY MOLDING DIE

(75) Inventor: Tadanobu Asaoka, Takahama (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 12/173,119

(22) Filed: Jul. 15, 2008

(65) Prior Publication Data

US 2009/0028979 A1 Jan. 29, 2009

(30) Foreign Application Priority Data

Jul. 24, 2007 (JP) .............................. 2007-191780

(51) Int. Cl.
*B29C 47/12* (2006.01)
(52) U.S. Cl. .............................. 425/192 R; 264/177.12; 425/380; 425/461; 425/467
(58) Field of Classification Search ............. 425/192 R, 425/380, 461, 467; 264/177.12
See application file for complete search history.

(56) References Cited

U.S. PATENT DOCUMENTS

| | | | | |
|---|---|---|---|---|
| 3,790,654 A | * | 2/1974 | Bagley | .................. 264/177.11 |
| 4,668,176 A | * | 5/1987 | Zeibig et al. | ................. 425/464 |
| 4,915,612 A | * | 4/1990 | Gangeme et al. | ............ 425/464 |
| 5,256,054 A | * | 10/1993 | Cocchetto et al. | ........... 425/462 |
| 5,906,839 A | * | 5/1999 | Miura et al. | ................. 425/380 |
| 6,854,969 B2 | | 2/2005 | Shibagaki et al. | |
| 2007/0026188 A1 | * | 2/2007 | Bookbinder et al. | .......... 428/73 |

FOREIGN PATENT DOCUMENTS

JP 2002-283326 10/2002

* cited by examiner

*Primary Examiner*—Robert B Davis
*Assistant Examiner*—Joseph Leyson
(74) *Attorney, Agent, or Firm*—Nixon & Vanderhye, PC (57) ABSTRACT

A honeycomb structure body molding die is disclosed including a die main body, having a feed bore section and a slit recess section, and a guide ring having an upright support section and a guide section carried on the upright section, which includes a stepped section and has a central slit recess forming section, provided on the stepped section, and an outer circumferential slit recess forming surface. The die main body has a non-opposing region, formed on an area outside the stepped section, in which the outer circumferential slit recess forming surface does not axially face the guide section, while having a feed bore closing region closing the feed bores. The die main body has outer circumferential-skin forming material feed passages formed in an area outside the feed bore closing region for feeding the molding material to a squeezing outlet for forming an outer circumferential skin.

5 Claims, 9 Drawing Sheets

FIG. 9

HONEYCOMB STRUCTURE BODY MOLDING DIE

CROSS REFERENCE TO RELATED APPLICATIONS

This application is related to Japanese Patent Application No. 2007-191780, filed on Jul. 24, 2007, the content of which is hereby incorporated by reference.

BACKGROUND OF THE INVENTION

1. Technical Field of the Invention

The present invention relates to a honeycomb structure body molding die for extrusion molding a honeycomb structure body.

2. Description of the Related Art

There has been known a honeycomb structure body 8 (see FIG. 6) as a catalyst carrier for carrying a catalyst that purifies exhaust gases emitted from an internal combustion engine of an automotive vehicle or the like. The honeycomb structure body 8 is, for instance, honeycomb-shaped cell walls 81, a large number of cells 82 surrounded with the cell walls 81, and a cylindrical outer circumferential skin 83 covering an outer circumferential sidewall.

In general, the honeycomb structure body 8 is manufactured upon extrusion molding a material including a ceramic raw material by using a honeycomb structure body molding die.

Attempts have heretofore been made in the related art to provide honeycomb structure body molding dies in various structures as disclosed in Japanese Patent Application Publication 2002-283326.

Figure 9:
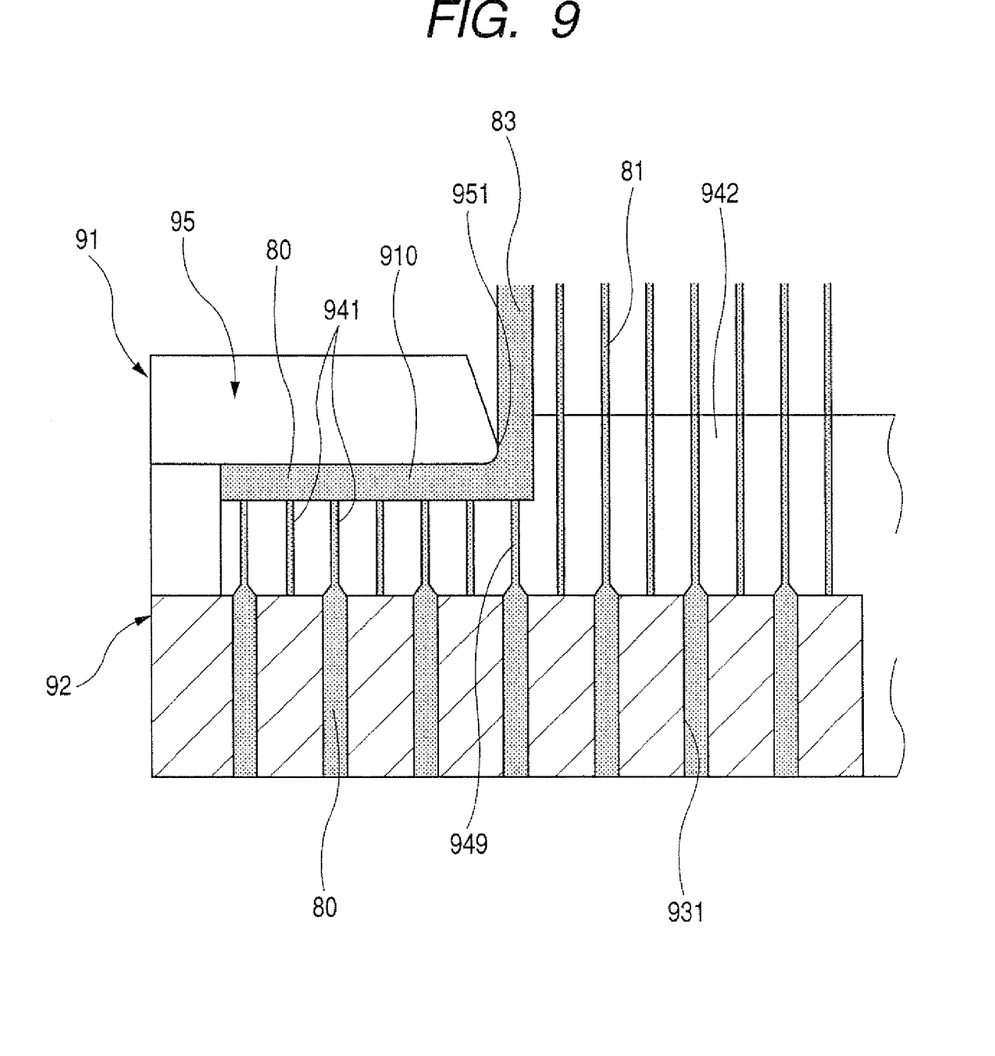
FIG. 9 is a cross sectional view showing how a honeycomb structure body is extrusion molded using a honeycomb structure body molding die of the related art.

As shown in FIG. 9, for instance, for instance, the honeycomb structure body molding die 91 includes a die main body 92, having material feed bores 931 for feeding the molding material 80, and lattice-shaped slit recesses 941 for squeezing a molding material to form a honeycomb structure body, and a guide ring 95 for guiding the molding material 80, squeezed from the slit recesses 941, to obtain a desired outer profile. Further, the die main body 92 has a stepped section 942 formed in an area radially displaced from the guide ring 95 and protruding in an extruding direction of the molding material 80.

When extrusion molding the material 80 by using the honeycomb structure body molding die 91 of the structure described above, as shown in FIG. 9, the molding material 80 is squeezed from the slit recesses 941 axially facing the guide ring 95 to flow into a clearance 910 between the die main body 92 and the guide ring 95. Then, the molding material 80 flows through the clearance 910 in a direction toward the center of the die main body 92. At a radially inward guide end 951 of the guide ring 95, the stepped section 942 restricts the molding material 80 from further moving intact toward the center of the die main body 92. During such inward movement of the molding material 80, the guide ring 95 guides the molding material 80 to turn the same in the extruding direction such that the honeycomb structure body 8 is formed with an outer circumferential skin 83 made of extruded molding material 80.

As set forth above, almost every part of the material 80 forming the outer circumferential skin 83 is squeezed from the slit recesses 941, held in face-to-face relationship with the guide ring 95, to flow in the extruding direction, upon which the material 80 moves toward the center of the die main body 92. Thereafter, the molding material 80 turns in the extruding direction along an axial direction of the die main body 92.

Meanwhile, the die main body 92 has a slit recess (such a, for instance, a slit recess 949 shown in FIG. 9) opening at a position where the die main body 92 does not axially face the guide ring 95. Thus, the molding material 80 partly contains a material component squeezed from such a slit recess in the extruding direction. The squeezed material component merges with the other component delivered through the clearance. Thus, the squeezed material component and the other component of the molding material 80 are squeezed intact in the extruding direction, thereby forming the outer circumferential skin 83.

That is, the molding material 80 includes one material flow component flowing toward the center of the die main body 92 and the other material flow component squeezed from the slit recess. These material flow components merge with each other in an area in close proximity to the radially inward guide end 951 of the guide ring 95. When this takes place, the material flow components flow in different directions on a stage before these material flow components merge with each other, causing instable moldability of the outer circumferential skin 83. This caused an issue to arise with the occurrence of the outer circumferential skin 83 formed with nonuniform thickness and deteriorated strength.

SUMMARY OF THE INVENTION

The present invention has been completed with a view to addressing the above issues and has an object to provide a honeycomb structure body molding die that can prevent an outer circumferential skin from having a nonuniform thickness and deteriorated strength or the like for thereby enabling the outer circumferential skin to be formed with high precision in a stable manner.

To achieve the above object, one aspect of the present invention provides a honeycomb structure body molding die for molding a honeycomb structure body having cells walls formed in a honeycomb shape, a large number of cells surrounded with the cells walls, and a cylindrical outer circumferential skin covering an outer circumferential sidewall. The cell walls and the outer circumferential skin are unitarily formed. A die main body has material feed bores, through which a molding material is fed, and lattice-shaped slit recesses formed in communication with the material feed bores, respectively, for forming the molding material into a honeycomb configuration. A guide ring has an upright support section, extending from the die main body in an extruding direction of the molding material, and a guide section protruding inward from the upright support section with a clearance spaced from the die main body. The die main body has a stepped section protruding in the extruding direction of the molding material in an area radially displaced from the guide section and having a slit recess forming surface. The stepped section has a central slit recess forming surface. An outer circumferential slit recess forming surface is formed in an outside area around the stepped section. The die main body has a feed bore closing region, closing the material feed bores present in the feed bore closing region to block a supply of the molding material therethrough, which is formed on the outside area around the stepped section in a region covering at least a non-opposing region in which the outer circumferential slit recess forming surface does not face the guide section. The die main body has a radially outward area outside the feed bore closing region formed with outer circumferential-skin forming material feed passages to feed the molding material to the clearance for forming the outer circumferential skin.

With the honeycomb structure body molding die of one aspect of the present invention, the die main body has the feed bore closing region in which the feed bores are closed to disable the supply of the molding material. The feed bore closing region is a region including at least a non-opposing direction in which the outer circumferential slit recess forming surface does not axially face the guide section. Therefore, during a process in which the honeycomb structure body is extrusion molded, the molding material has no material flow component, flowing through the slit recess present in the non-opposing region, which would merge with the other material flow component passing through the clearance between the die main body and the guide section for forming the outer circumferential skin in the extruding direction.

That is, according to one aspect of the present invention, in extrusion molding the honeycomb structure body, the outer circumferential skin of the honeycomb structure body can be formed of only the material flow component of the molding material passing through the clearance between the die main body and the guide section. In particular, the molding material is squeezed from the outer circumferential-skin forming material feed passages formed in an area outside of the feed bore closing region and supplied into the clearance, after which the material flow component moves toward the center of the die main body. Thereafter, the flow component of the molding material 80 is guided with the guide section at the guide end thereof and a further radiated inward movement of the material flow component toward the center of the die main body is restricted with the stepped section. Subsequently, the flow component of the molding material turns in the extruding direction, thereby forming the outer circumferential skin. This enables the outer circumferential skin to be formed of only the material flow component flowing in a common flowing direction. Thus, the outer circumferential skin can be stably formed with high precision. This results in a capability of suppressing the formation of the outer circumferential skin with defects such as nonuniform thickness and deteriorated strength, etc.

Thus, with the honeycomb structure body molding die of one aspect of the present invention, the outer circumferential skin can be formed with high precision in a stable manner with no occurrence of defects such as nonuniform thickness and deteriorated strength, etc. This results in a capability of extrusion molding the honeycomb structure body with increased quality.

According to another aspect of the present invention, there is provided a honeycomb structure body molding die for molding a honeycomb structure body having cells walls formed in a honeycomb shape, a large number of cells surrounded with the cells walls, and a cylindrical outer circumferential skin covering an outer circumferential sidewall, wherein the cell walls and the outer circumferential skin are unitarily formed, comprising: a die main body having material feed bores, through which a molding material is fed, and lattice-shaped slit recesses formed in communication with the material feed bores, respectively, for forming the molding material into a honeycomb configuration; the die main body including a stepped section protruding in an extruding direction of the molding material and having a central slit recess forming surface formed on the stepped section formed with the slit recesses in communication with the feed bores, respectively, and an annular outer circumferential slit recess forming surface formed in an outside area around the stepped section and having the slit recesses in communication with the feed bores, respectively, wherein the stepped section has an outer circumferential sidewall; a guide ring including an upright support section, extending from the die main body along the extruding direction of the molding material, and an annular guide section unitarily fixed to the upright support section and protruding radially inward therefrom at a position distanced from the outer circumferential slit recess forming surface of the die main body so as to provide an annular material feed path in the form of a clearance spaced from the die main body, the annular guide section having a radially inward guide end radially spaced from the outer circumferential sidewall of the stepped section by a given distance to provide a squeezing outlet through which the molding material is squeezed to form the outer circumferential skin of the honeycomb structure body; and an annular feed bore closing region, formed on the die main body, which closes the material feed bores present in the feed bore closing region to block a supply of the molding material therethrough and is formed on the outside area around the stepped section in a region covering at least a non-opposing region between the guide section and the stepped section in which the outer circumferential slit recess forming surface does not axially face the guide section. The die main body has an outward area formed with outer circumferential-skin forming material feed passages to feed the molding material to the squeezing outlet for forming the outer circumferential skin.

According to still another aspect of the present invention, there is provided a honeycomb structure body molding die for molding a honeycomb structure body having cells walls formed in a honeycomb shape, a large number of cells surrounded with the cells walls, and a cylindrical outer circumferential skin covering an outer circumferential sidewall, wherein the cell walls and the outer circumferential skin are unitarily formed, comprising: a die main body having material feed bores, through which a molding material is fed, and lattice-shaped slit recesses formed in communication with the material feed bores, respectively, for forming the molding material into a honeycomb configuration; the die main body including a slit recess section, having a stepped section protruding in an extruding direction of the molding material, which has a central slit recess forming surface formed on the stepped section formed with the slit recesses in communication with the feed bores, respectively, an annular outer circumferential slit recess forming surface formed in an outside area around the stepped section and having the slit recesses in communication with the feed bores, respectively, wherein the slit recess section has an outer circumferential periphery and the stepped section has an outer circumferential sidewall; a guide ring including an upright support section, extending from the die main body along the extruding direction of the molding material at a position spaced from the outer circumferential periphery of the slit recess section to provide an outer circumferential skin material feed passage, and an annular guide section unitarily fixed to the upright support section and having an annular inner surface distanced from the outer circumferential slit recess forming surface of the die main body so as to provide an annular material feed path in the form of a clearance spaced from the die main body in communication with the outer circumferential-skin material feed passage, the annular guide section having a radially inward guide end radially spaced from the outer circumferential sidewall of the stepped section by a given distance to provide a squeezing outlet through which the molding material is squeezed to form the outer circumferential skin of the honeycomb structure body; the annular inner surface of the guide section having a pool recess axially concaved along the extruding direction of the molding material to temporarily pool the molding material, delivered from the outer circumferential-skin material feed passage, in a position upstream of the annular material feed path; an annular molding material blocking member provided on the die main body, closing the material feed bores present in the feed bore closing region to block a supply of the molding material to the annular material feed path; and outer circumferential-skin forming material feed passages formed in the die main body for feeding the molding material to the outer circumferential-skin material feed passage to cause the molding material to pass through the annular material feed path for squeezing the molding material through the squeezing outlet to form the outer circumferential skin.

DETAILED DESCRIPTION OF PREFERRED EMBODIMENTS

Now, a honeycomb structure body molding die of one embodiment according to the present invention will be described below in detail with reference to the accompanying drawings. However, the present invention is construed not to be limited to such an embodiment described below and technical concepts of the present invention may be implemented in combination with other known technologies or the other technology having functions equivalent to such known technologies.

In the following description, the term "extruding direction" refers to a direction as indicated by an arrow ED in FIG. 5 in which the molding material is squeezed from the die main body along the axial direction thereof.

Further, the term "slit recess forming surface" refers to a surface of the die main body in which the slit recesses are formed.

Furthermore, the slit recesses may take the form of various latticed shapes in conformity to shapes of the cell walls forming the honeycomb structure body. These include, for instance, a triangular, squared and hexagonal shape or the like.

With the honeycomb structure body molding die discussed above, the outer circumferential-skin forming material feed passages may preferably include the material feed bores and the slit recesses present in the radially outward area outside of the feed bore closing region.

With such a structure, the molding material, supplied to the material feed bores present in the radially outward area outside of the feed bore closing region and squeezed from the slit recesses in communication with those material feed bores, is admitted to the clearance between the guide end of the guide section and the stepped section of the die main body, thereby forming the outer circumferential skin.

Further, the outer circumferential-skin forming material feed passages may preferably include through bores formed in the radially outward area of the die main body at a position outside of the feed bore closing region so as to extend therethrough.

In this case, the molding material is supplied to the through bores, present in an area radially outward of the feed bore closing region, through which the molding material is squeezed to form the outer circumferential skin.

Furthermore, the outer circumferential-skin forming material feed passages may be comprised of only the material feed bores and the associated slit recesses present in the radially outward area outside the feed bore closing region or may be comprised of only the through bores. In an alternative, the outer circumferential-skin forming material feed passages may be structured using these component parts in combination.

Moreover, the feed bore closing region may be preferably formed with a molding material blocking member placed on the die main body to close the material feed bores in the feed bore closing region to block the molding material from passing therethrough.

In this case, the term "feed bore forming surface" refers to a surface of the die main body in which the material feed bores are formed.

Further, the molding material blocking member may take the form of various structures. For instance, a plate-like member may be employed as the molding material blocking member. Locating the molding material blocking member on the feed bore forming surface of the die main body enables opening portions of selected material feed bores to be closed to prevent the entry of the molding material.

First Embodiment

Now, a honeycomb structure body molding die of an embodiment according to the present invention is described below with reference to FIGS. 1 to 3 of the accompanying drawings.

Figure 1:
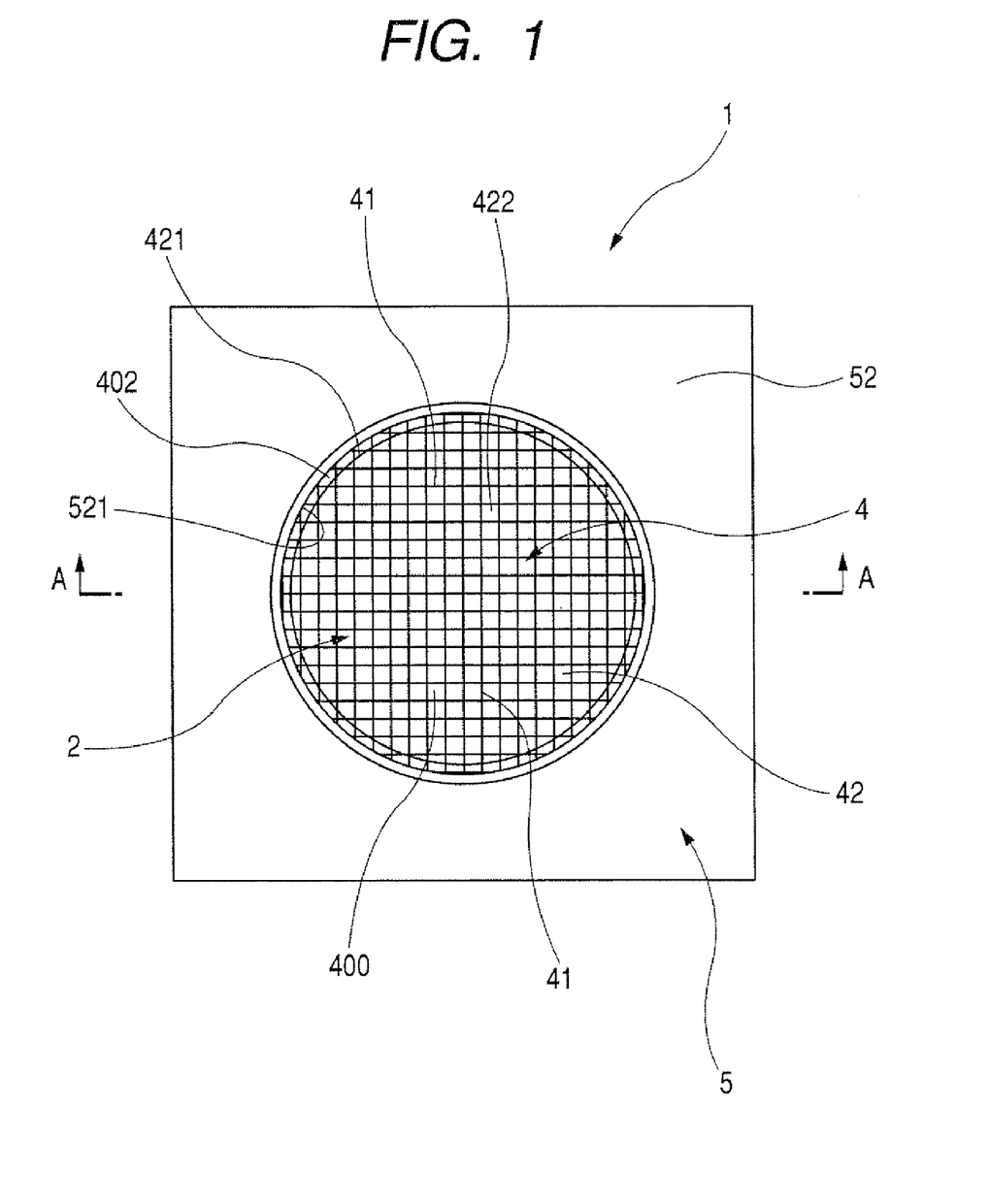
FIG. 1 is a plan view showing a honeycomb structure body molding die of a first embodiment according to the present invention.
Figure 2:
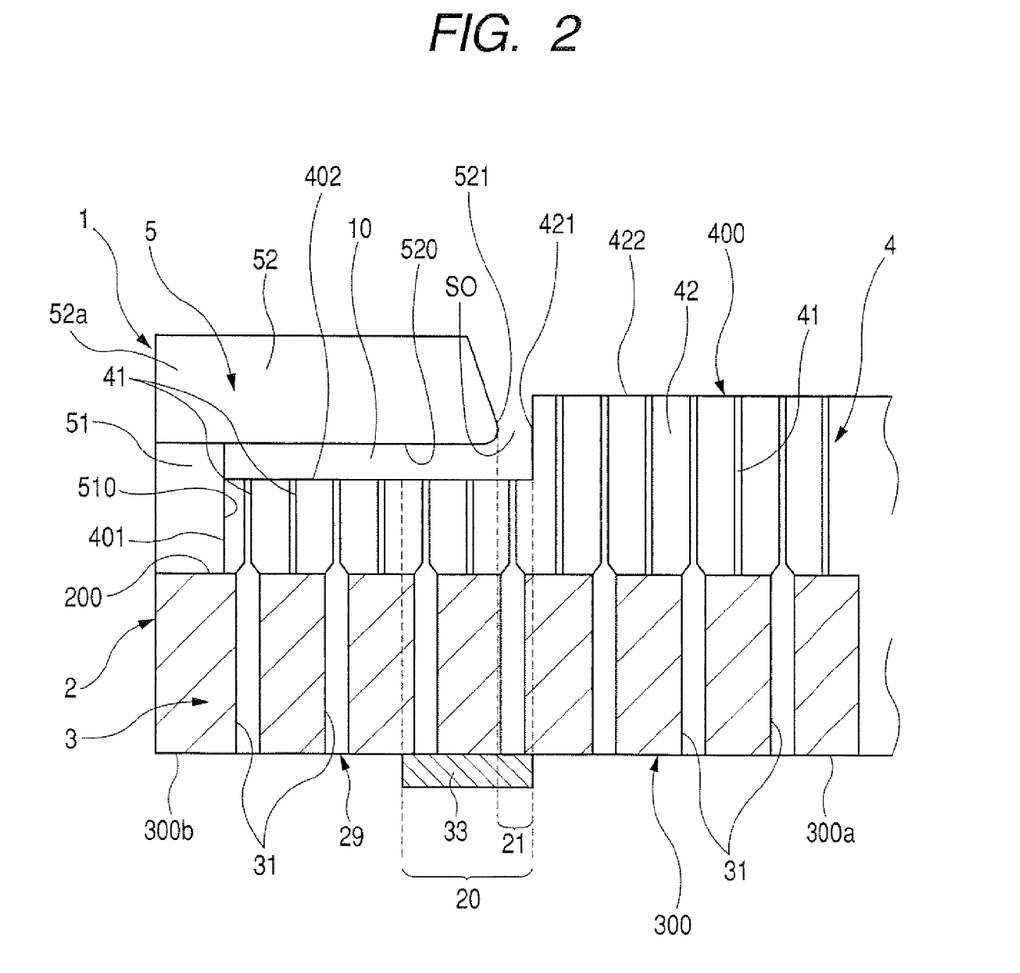
FIG. 2 is a cross sectional view taken on line A-A of FIG. 1.
Figure 3A:
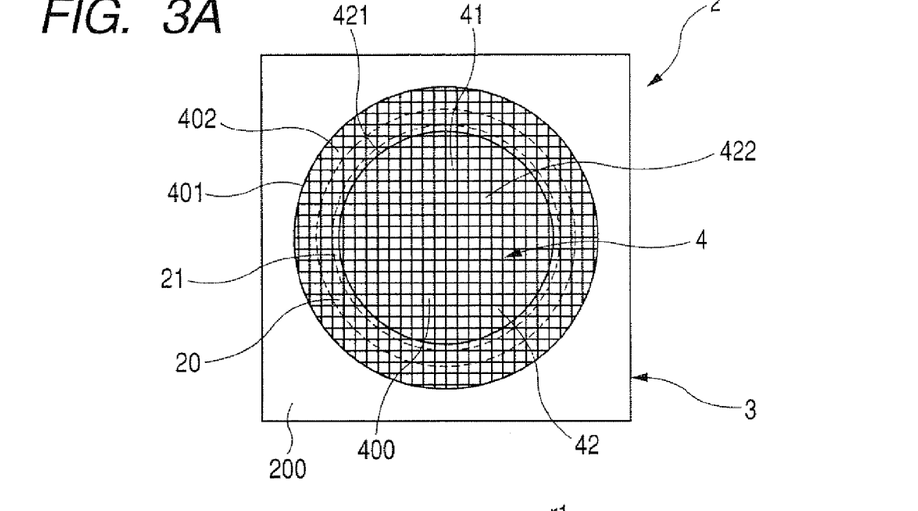
FIG. 3A is an illustrative view showing a slit recess forming surface of a die main body forming part of the honeycomb structure body molding die of the first embodiment shown in FIG. 1.
Figure 3B:
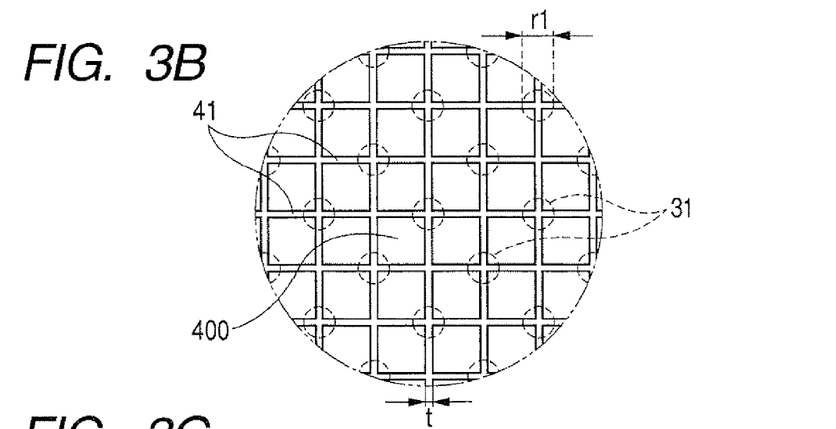
FIG. 3B is an enlarged view of the slit recess forming surface shown in FIG. 3A.
Figure 3C:
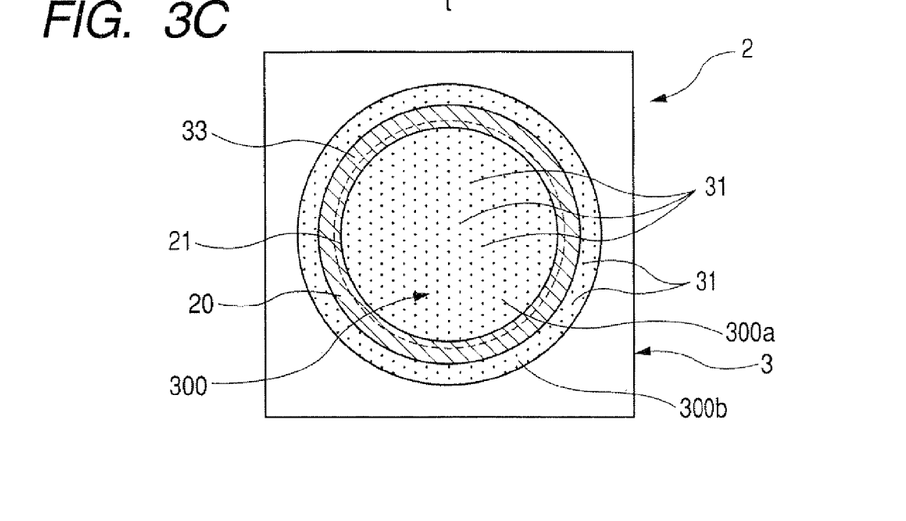
FIG. 3C is an illustrative view showing a feed bore forming surface of the die main body.

As shown in FIGS. 1 to 3, the honeycomb structure body molding die 1 of the present embodiment serves to mold a honeycomb structure body 8 (see FIG. 6) having honeycomb-shaped cell walls 81, a large number of cells 82 defined with the cell walls 81, and an outer circumferential skin 83 (see FIG. 6) with the cell walls 81 and the outer circumferential skin 83 being unitarily formed in structure.

As shown in FIGS. 1 and 2, the honeycomb structure body molding die 1 is comprised of a die main body 2 and an outer circumferential guide ring 5. The die main body 2 has guide holes (not shown) through which the guide ring 5 is fixedly mounted. Likewise, the guide ring 5 has guide holes through which the die main body 2 is fixedly located.

As shown in FIGS. 1 and 2, the die main body 2 includes a feed bore section 3 formed with a large number of material feed bores 31 for feeding a molding material therethrough, and a slit recess section 4 having square- and lattice-shaped slit recesses 41 formed in communication with the material feed bores 31, respectively, for shaping the molding material into a honeycomb compact body.

As shown in FIGS. 2 and 3A, the die main body 2 has an outer peripheral area formed with a reference surface 200 and a central area formed with a circular stepped section 42. The circular stepped section 42 protrudes from the die main body 200 in an extrusion direction and has an outer circumferential sidewall 421 radially spaced from a radially inward end of a guide ring 5 described below in detail. The die main body section 2 has a slit recess forming surface 400 including an outer circumferential slit recess forming surface 402 and a central slit recess forming surface 422 formed on the stepped section 42.

As shown in FIG. 2, the feed bore section 3 has the material feed bores 31 extending from a feed bore forming surface 300 (on a plane opposite to the slit recess forming surface 400) in the extrusion direction in communication with the slit recesses 41.

Further, as shown in FIG. 3B, the material feed bores 31 are formed in the die main body 2 at lattice positions each corresponding to an every other lattice position among lattice points of the square- and lattice-shaped slit recesses 41. Each of the material feed bores 31 has an inner diameter r1 of 1.5 mm and each of the slit recesses 41 has a width "t" of 100 μm.

As shown in FIGS. 1 and 2, the annular guide ring 5 includes an upright support section 51, extending from a reference surface 200 of the die main body 2, and a guide section 52, having an outer circumferential end portion 52a supported with the upright support section 51, which extends radially inward. The guide section 52 is spaced from the outer circumferential slit recess forming surface 402 to provide a clearance 10 therebetween.

The upright support section 51 takes the form of a ring shape in a structure held in abutting engagement with an outer circumferential sidewall 401 of the slit recess section 4 of the die main body 2. The upright support section 51 is designed to have a height that is greater than a height of the outer circumferential slit recess forming surface 402 of the slit recess section 4, thereby ensuring the formation of the clearance 10.

The guide section 52 has an opposing guide surface 520, facing the outer circumferential slit recess forming surface 402 of the slit recess section 4, which extends radially inward so as to maintain the clearance 10 between the outer circumferential slit recess forming surface 402 and the opposing guide surface 520. The guide section 52 has a radially inward guide end 521, placed in a radially inward position, which is formed in a circular configuration in conformity to an outer profile of the honeycomb structure body 8 to be obtained. In addition, the radially inward guide end 521 is radially spaced from the outer circumferential sidewall 421 of the stepped section 42 by a given distance corresponding to a thickness of the outer circumferential skin 83 to be formed.

As shown in FIG. 3C, with the present embodiment, the die main body 2 has a feed bore closing region 20 that closes the material feed bores 31 to disable the supply of molding material therethrough. The feed bore closing region 20 includes a region involving a non-opposed region 21, defined between the radially inward guide end 521 and the outer circumferential sidewall 421, in which no outer circumferential slit recess forming surface 402 faces the guide section 52. With the present embodiment, the feed bore closing region 20 is formed by placing a molding material blocking member 33, taking the form of an annular ring, on a given specified area of the feed bore forming surface 300 to prevent the entry of molding material 80 to the material feed bores 31.

Further, no detailed configurations of the material feed bores 31 are shown in FIG. 3C and the feed bore forming surface 300 has a central feed bore forming region 300a and an outer circumferential feed bore forming region 300b that are radially spaced from each other by the feed bore closing region 20.

As shown in FIG. 2, further, the outer circumferential feed bore forming region 300b has outer-circumferential skin forming material feed bores 29 through which the molding material is supplied to the clearance 10 for forming the outer circumferential skin 83. The outer-circumferential skin forming material feed bores 29 include the material feed bores 31, located in the outer circumferential feed bore forming region 300b, and the recesses 41 whose axial ends are exposed to the outer circumferential slit recess forming surface 402 in communication with the material feed bores 31, respectively.

Next, a method of manufacturing the honeycomb structure body molding die 1 of the present embodiment will be simply described below.

In preparing the honeycomb structure body molding die 1 of the present embodiment, first, a square-shaped plate member, made of hot work tool steel (JIS SKD61), is used as a die raw material 20.

Figure 4A:
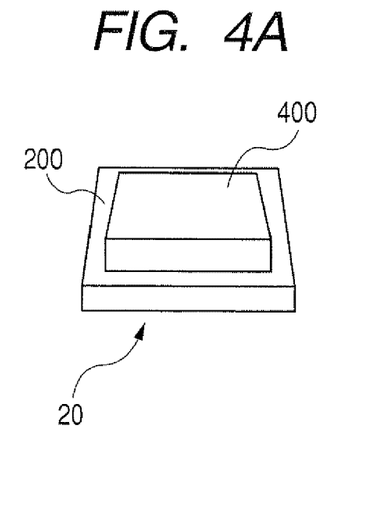
FIGS. 4A to 4D are illustrative views showing various steps of manufacturing the die main body forming part of the honeycomb structure body molding die of the first embodiment shown in FIG. 1.

As shown in FIG. 4A, subsequently, outer-circumference rough machining is conducted to cut an outer circumferential area of the die raw material 20 so as to form the reference surface 200 and the slit recess forming surface 400 that protrudes from the reference surface 200.

Figure 4B:
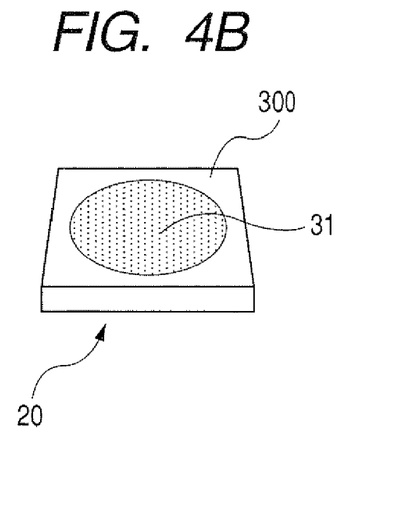

As shown in FIG. 4B, a large number of material feed bores 31 are formed on a rear surface of the raw molding material 20 on a plane opposite to the roughly machined surface thereof and serving as the feed bore forming surface 300 by drilling using a drill.

Figure 4C:
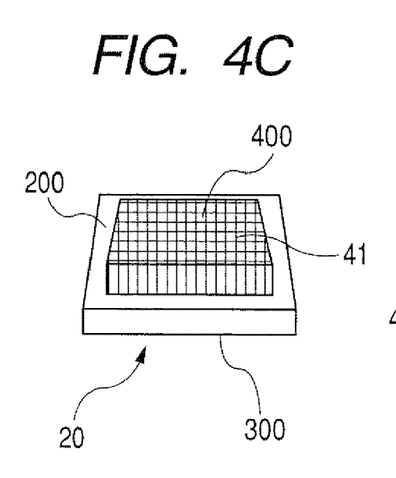

Then, as shown in FIG. 4C, a large number of slit recesses 41 are formed on the slit recess forming surface 400 of the die raw material 20 one by one in a square-shaped lattice pattern by using a disc-like grinding stone (not shown).

Figure 4D:
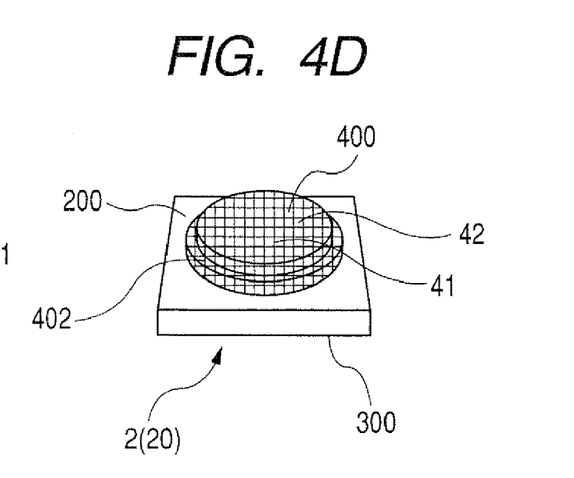

Subsequently, as shown in FIG. 4D, the die raw material 20 is machined to form an outer circumferential periphery of the slit recess forming surface 400 of the die raw material 20 in a given circular configuration. Then, stepped-profile machining is conducted on the slit recess forming surface 400 of the die raw material 20 to form the outer circumferential slit recess forming surface 402 and the stepped section 42 in a central area of the slit recess forming surface 400 so as to protrude from the outer circumferential slit recess forming surface 402, thereby obtaining the die main body 2.

Next, the guide ring 3 is assembled onto the resulting die main body 2. In fixedly mounting the guide ring 3 onto the resulting die main body 2, the guide ring 5 is placed on the reference surface 200 of the die main body 2 by using plural fixing pins (not shown) embedded into the pin holes of the die main body 2 and the pin holes of the guide ring 5. During such placement, an inner circumferential surface 510 of the upright support section 51 of the guide ring 5 is brought into abutting engagement with the outer circumferential sidewall 401 of the slit recess section 4 of the die main body 2.

With the steps conducted in such a way mentioned above, the honeycomb structure body molding die 1 is obtained.

Now, a method of manufacturing the honeycomb structure body 8 by using the honeycomb structure body molding die 1 of the structure discussed above is described below in detail.

First, the honeycomb structure body molding die 1 is set to a screw type extrusion molding machine (not shown) at a distal end thereof. Then, a kneaded ceramic raw molding material is supplied into the extrusion molding machine. Examples of the ceramic raw material include a cordierite yielding raw material powder containing kaolin, fused silica, aluminum hydroxide, alumina and talc, which are blended to finally form a chemical composition of cordierite as a principal component. The cordierite yielding raw material powder is further mixed with water, a binder and pore forming materials or the like, upon which a resulting mixture is kneaded.

Figure 5:
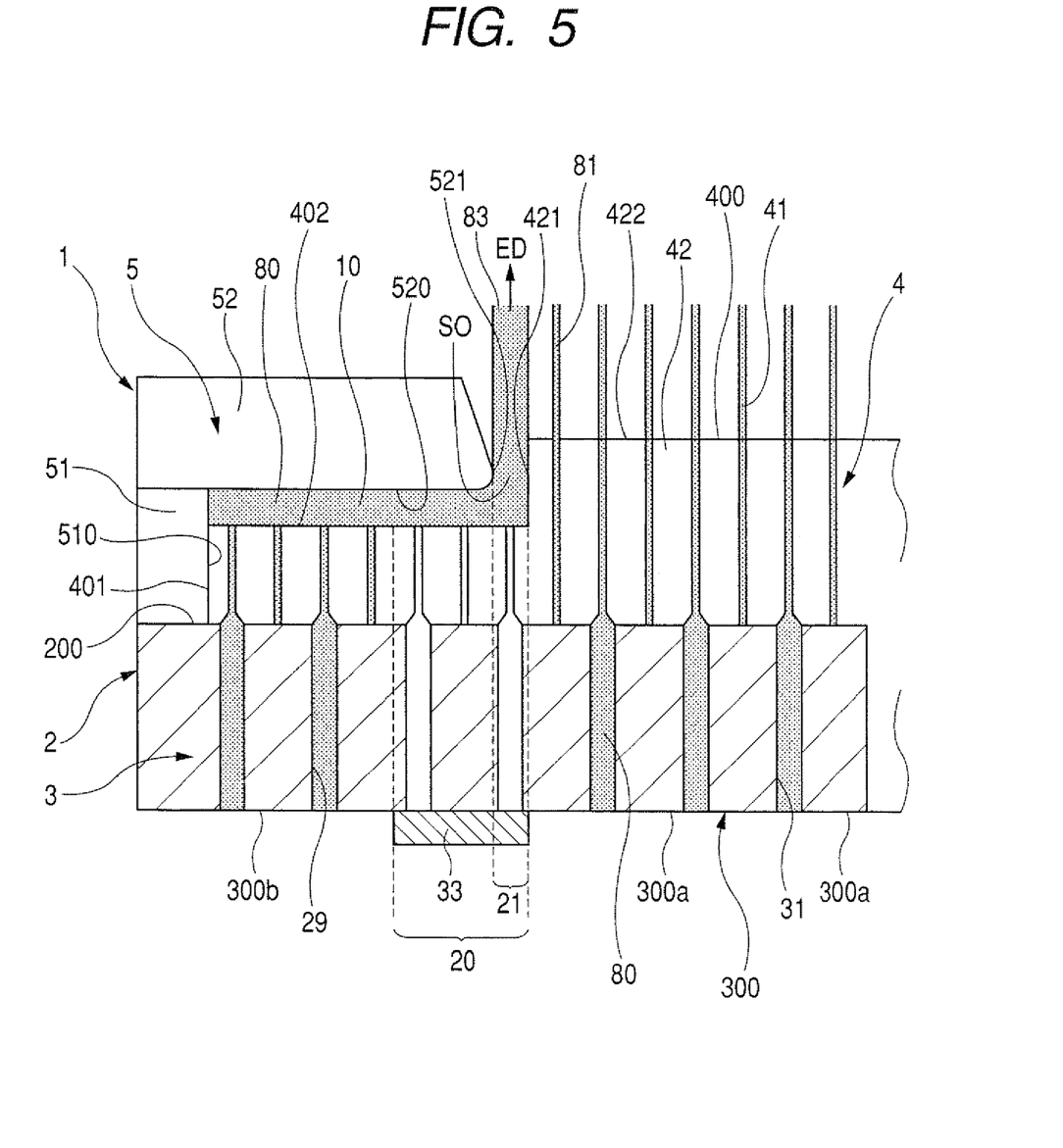
FIG. 5 is a cross sectional view showing how a honeycomb structure body is extrusion molded using the honeycomb structure body molding die of the first embodiment shown in FIG. 1.

As shown in FIG. 5, more particularly, the screw type extrusion molding machine operates to feed the molding material 80 into the material feed bores 31 of the honeycomb structure body molding die 1. During such supply of the molding material 80, no molding material 80 is fed to the material feed bores 31 closed with the molding material blocking member 33.

Then, the molding material 80 is admitted to the material feed bores 31, associated with the outer circumferential feed bore forming region 300b, and squeezed through the slit recesses 41, associated with the outer circumferential slit recess forming surface 402, into the clearance 10 between the outer circumferential slit recess forming surface 402 and the guide opposing guide surface 520 of the guide ring 5. That is, the molding material 80 is squeezed through the outer circumferential skin forming material feed bores 29 and the slit recesses 41 in communication therewith to go into the clearance 10. Thus, the molding material 80 goes through the clearance 10 to move radially inward toward a center of the stepped section 42 of the die main body 2. Then, the molding material 80 is brought into abutting engagement with the outer circumferential sidewall 421 of the stepped section 42 to flow around a right angle in an area between the radially inward guide end 521 of the guide ring 5 and the outer circumferential sidewall 421 of the stepped section 42. This results in the formation of the outer circumferential skin 83 of the honeycomb structure body.

Further, simultaneously, the molding material 80 is admitted to the material feed bores 31 associated with the central feed bore forming region 300a and squeezed through the slit recesses 41 exposed to the central slit recess forming surface 422, thereby directly forming the cell walls 81 in a squared lattice pattern.

Figure 6:
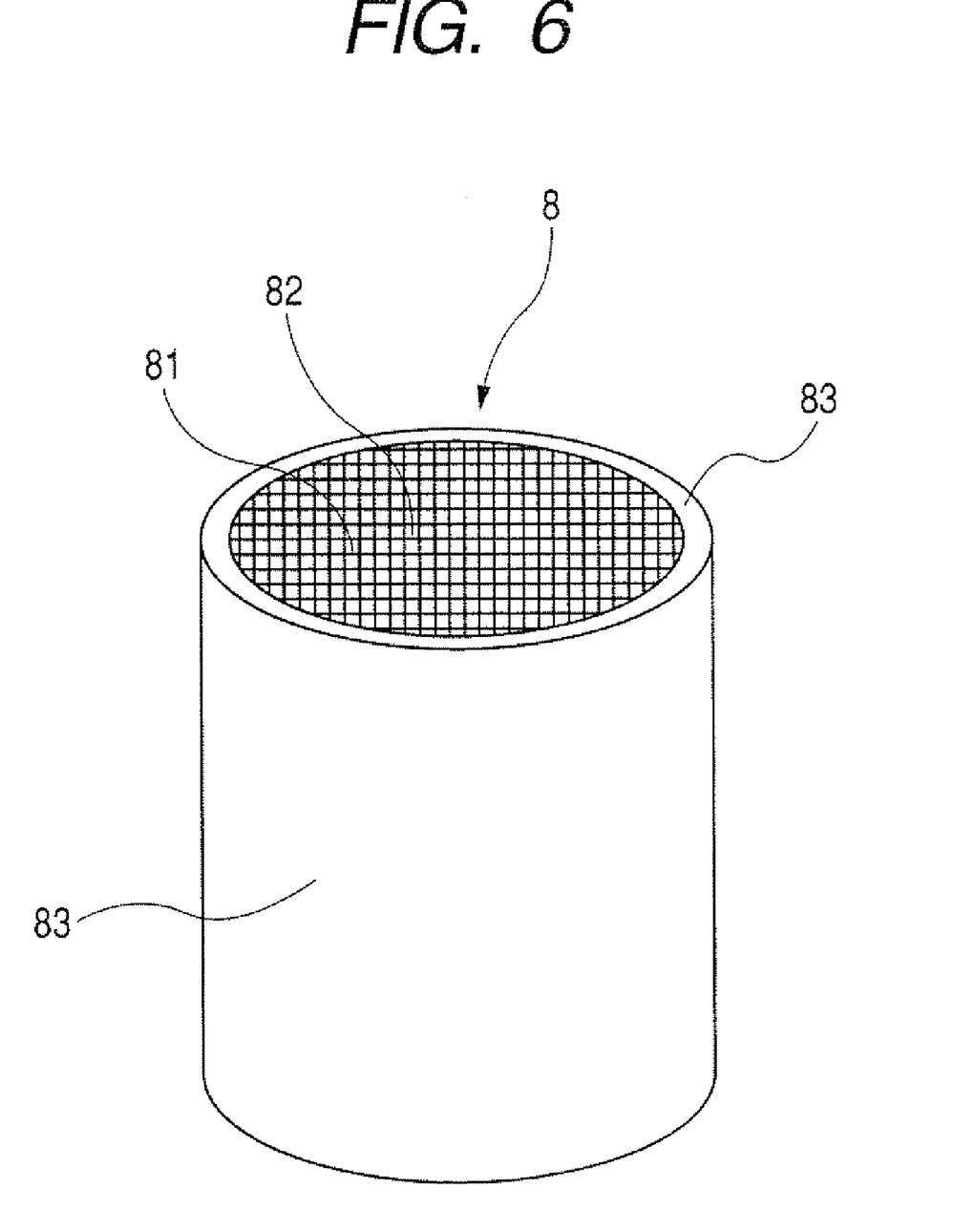
FIG. 6 is a perspective view showing the honeycomb structure body formed using the molding die of the first embodiment shown in FIG. 1.

Thus, the outer circumferential skin 83 and the cell walls 81 are integrally formed in a coincidental development, thereby forming the honeycomb structure body 8 having the honeycomb-shaped cell walls 81, the large number of cells 82 surrounded with the cell walls 81, respectively, and the outer circumferential skin 83 covering an outer circumferential sidewall of the honeycomb structure body 8.

In addition, the honeycomb structure body 8, formed upon extrusion process, is dried and fired at a given temperature, thereby preparing the honeycomb structure body 8 composed of cordierite ceramics.

Next, description is made of various advantageous effects of the honeycomb structure body molding die 1 of the present embodiment.

With the honeycomb structure body molding die 1 of the present embodiment, the die main body 2 has the feed bore closing region 20 in which the material feed bores 31 are closed not to permit the flow of molding material 80 therethrough. In addition, the feed bore closing region 20 has a radially inward area covering a non-opposing region 21 in which no area of the outer circumferential slit recess forming region 402 does not face the guide section 52. During the process in which the honeycomb structure body 8 is molded, the material blocking member 33, placed in the feed bore closing region 20, blocks the supply of the molding material 80 through the slit recesses 41 placed in the non-opposing region 21. Thus, no molding material 80, blocked in the non-opposing region 21, merges into the molding material 80 passing through the material feed path 10 between the outer circumferential slit recess forming surface 402 and the guide opposing surface 520 of the guide section 52.

That is, according to the present invention, during the process in which the honeycomb structure body 8 is molded, the outer circumferential skin 83 of the honeycomb structure body 8 to be obtained is formed with only the molding material 80 passing through the clearance 10 between the die main body 2 and the guide section 52. More particularly, the molding material 80 is supplied to the clearance 10 through the outer circumferential skin forming material feed bores 29 formed in the area outside of the feed bore closing region 20 and flows through the clearance 10 toward the center of the die main body 2. Then, the molding material 87 is brought into abutting contact with the outer circumferential sidewall 421 of the stepped section 42, with which further inward movement of the molding material 80 is restricted. This causes the molding material 80 to be squeezed through the clearance between the radially inward guide end 521 of the guide section 52 and the outer circumferential sidewall 421 of the stepped section 42. Thus, a leading end of the molding material 80 is caused to deflect in the extruding direction, thereby forming the outer circumferential skin 83. This allows the outer circumferential skin 83 to be formed with only the molding material 80 flowing in the same direction, thereby enabling the outer circumferential skin 83 to be stably formed with high precision. This enables the suppression of various defects such as thickness heterogeneity and a drop in strength of the outer circumferential skin 83.

With the honeycomb structure molding die 1 of the present embodiment, thus, the outer circumferential skin 83 can be stably formed with high precision without causing any occurrence of the various defects such as thickness heterogeneity and the drop in strength. Therefore, the honeycomb structure molding die 1 can mold the honeycomb structure body 8 with increased precision.

Second Embodiment

A honeycomb structure molding die 1A of a second embodiment according to the present invention is described below in detail.

The honeycomb structure molding die 1A of the present embodiment differs from the honeycomb structure molding die 1 of the first embodiment in respect of a guide ring 5A and associated component parts and, therefore, description will be made with a focus on such differing points.

Figure 7:
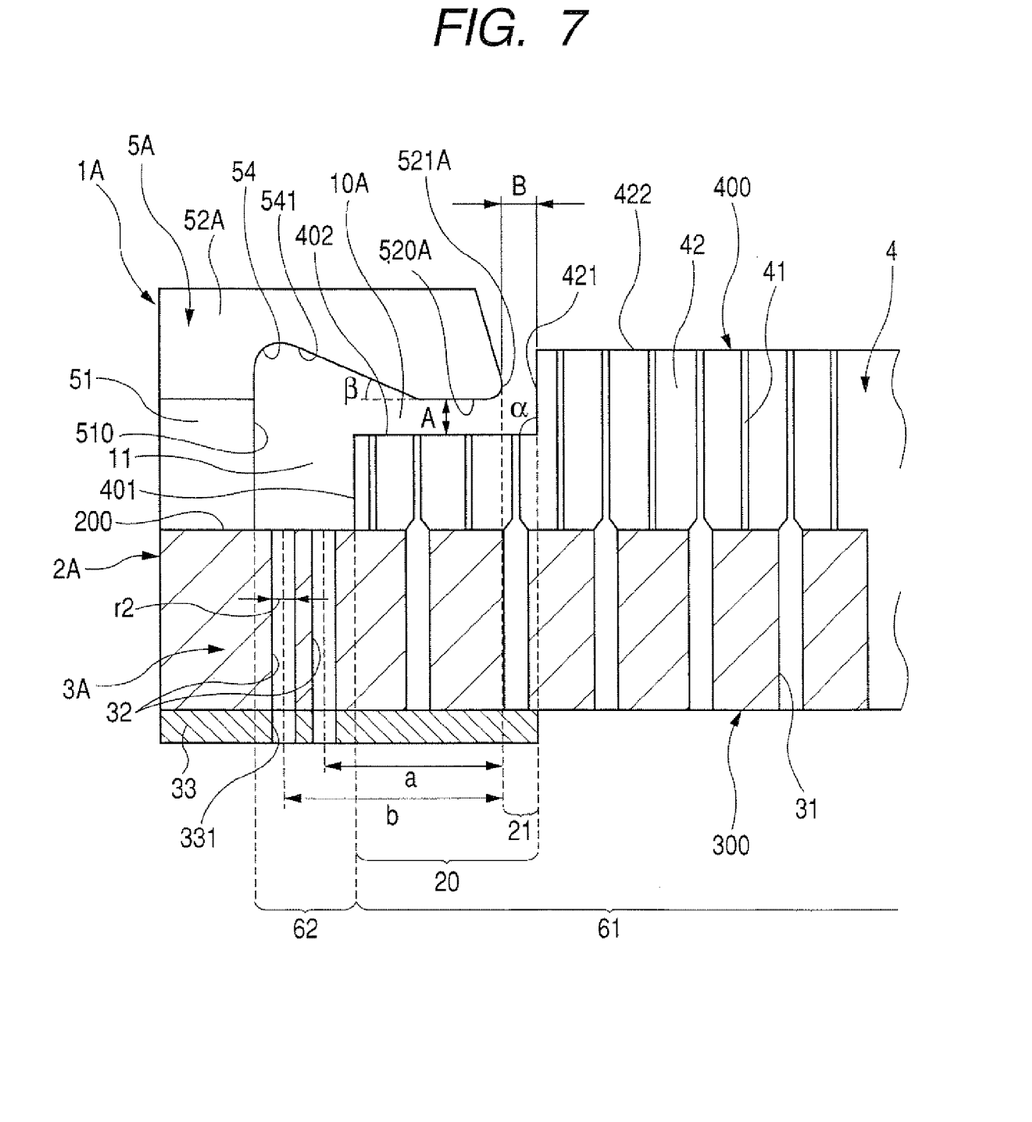
FIG. 7 is a cross sectional view showing a honeycomb structure body molding die of a second embodiment according to the present invention.

As shown in FIG. 7, with the honeycomb structure molding die 1A of the present embodiment, a die main body 2A has a central slit recess forming region 61, formed with the slit recesses 41, and an outer circumferential skin forming feed-bore forming region 62 formed in an area outside of the central slit recess forming region 61. The central slit recess forming region 61 corresponds to an area involving a slit recess forming surface 400 defined on a surface of the stepped section 42. The outer circumferential skin forming feed-bore forming region 62 takes the form of an annular shape that surrounds the central slit recess forming region 61 in a radially inward position.

The outer circumferential skin forming feed-bore forming region 62 is formed a plurality of outer circumferential skin forming material feed bores 32, having the same function as those of the outer circumferential skin forming material feed bores 29 of the first embodiment, which extend through a die main body 2A to feed a molding material for the outer circumferential skin 83 to be formed. The plural outer circumferential skin forming material feed bores 32 are formed in two rows in the outer circumferential skin forming feed-bore forming region 62. Each of the plural outer circumferential skin forming material feed bores 32 has an inner diameter r2 of 1.5 mm.

Further, the outer circumferential skin forming material feed bores 32, placed in a first circular row, have respective centers radially spaced from the radially inward guide end 521A of the guide section 5A by a first radial distance "a". Likewise, the outer circumferential skin forming material feed bores 32, placed in a second circular row, have respective centers radially spaced from the radially inward guide end 521A of the guide section 5A by a second radial distance "b". The first radial distance "a" is set to a value of 7 mm and the second radial distance "b" is set to a value of 10 mm.

Furthermore, the die main body 2A has an outer-circumferential-skin molding material feed passage 11 between the inner circumferential surface 510 of the upright support section 51 and the outer circumferential sidewall 401 of the slit recess section 4. The outer-circumferential-skin molding material feed passage 11 serves as a molding material flow passage to allow the molding material, squeezed from the outer circumferential skin forming material feed bores 32, to flow toward the guide section 52A in a downward direction. Moreover, the molding material blocking member 33 has first and second rows of communication bores 331 held in communication with the outer circumferential skin forming material feed bores 32, respectively.

As shown in FIG. 7, with the present embodiment, the stepped section 42 is formed with the outer circumferential sidewall 421 and the outer circumferential slit recess forming surface 402 which intersects at an angle α expressed as 90°≦α≦95°. In the illustrated embodiment, the angle α is set to a value of 90°.

Further, the guide section 52A has an opposing guide surface 520A axially spaced from the outer circumferential slit recess surface 402 by a distance A and has a radially inward guide end 521A radially spaced from the outer circumferential sidewall 421 of the stepped section by a distance B on a plane perpendicular to a traveling direction of the molding material with the distances A and B satisfied in the relationship expressed as A≦B<1.5A. In the illustrated embodiment, the distance A is set to a value of 0.4 mm and the distance B is set to a value of 0.55 mm.

As shown in FIG. 7, furthermore, the guide section 52A of the guide ring 5A has a radially outward area formed with a pool recess 54 that is axially dented in an annular curved shape from the opposing guide surface 520A over an entire circumference thereof.

The pool recess 54 has an inner surface formed with a pool recess inclined surface 541 that progressively decrease in depth from the outermost end of the pool recess 54 to the innermost end thereof. The pool recess inclined surface 541 is inclined with respect to the opposing guide surface 520A at an inclined angle β in the order of a value ranging from 10 to 20°. In the illustrated embodiment, the inclined angle β is set to 15°.

The honeycomb structure molding die 1A of the present embodiment has the other same feature as that of the honeycomb structure molding die 1 of the first embodiment.

Next, a method of manufacturing the honeycomb structure body 8 using the honeycomb structure molding die 1A of the present embodiment will be described below.

Figure 8:
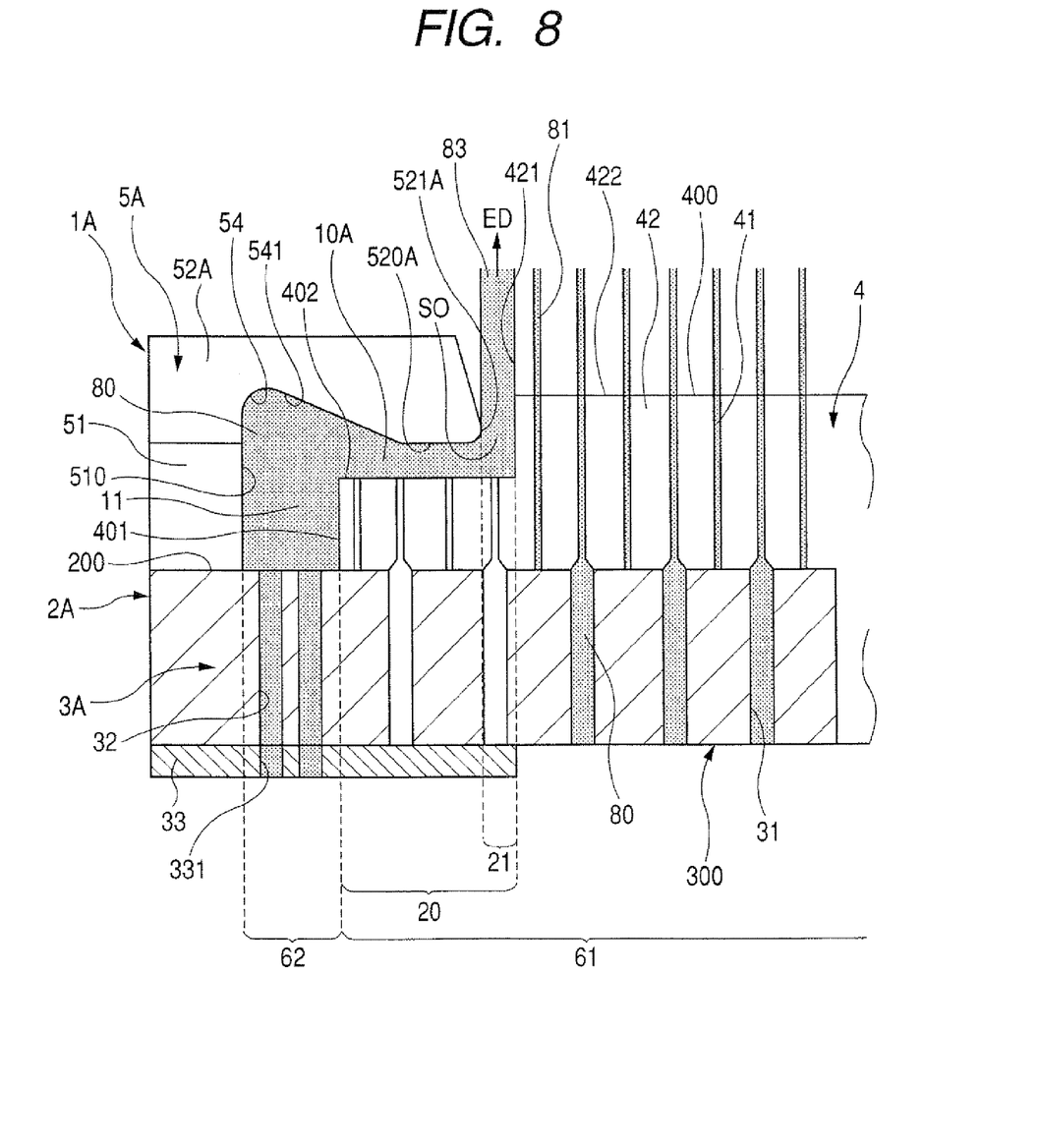
FIG. 8 is a cross sectional view showing how a honeycomb structure body is extrusion molded using the honeycomb structure body molding die of the second embodiment shown in FIG. 7.

As shown in FIG. 8, first, the molding material 80 is supplied to the material feed bores 31 and the outer circumferential skin forming material feed bores 32. In this case, no molding material 80 is admitted to the material feed bores 31 blocked with the molding material blocking member 33.

The molding material 80, admitted to the outer circumferential skin forming material feed bores 32, is squeezed from the reference surface 200 of the die main body 2A into the outer-circumferential-skin molding material feed passage 11. Then, the molding material 80 flows into a clearance 10A between the outer circumferential slit recess forming surface 402 and the opposing guide surface 520A of the guide section 52A to accumulate in the pool recess 54 once. Thereafter, the molding material 80 further flows from the pool recess 54 into the clearance 10A again to pass toward the center of the die main body 2A. Then, the molding material 80 is guided with the guide section 52 to turn in an extruding direction by the action of the outer circumferential sidewall 421 of the stepped section 42, thereby forming the outer circumferential skin 83.

Further, the molding material 80, admitted to the material feed bores 31 and the slit recesses 41 in communication therewith, is squeezed from the central slit recess forming surface 422 of the stepped section 42, thereby directly forming the square-lattice-shaped cell walls 81.

The manufacturing method of the present embodiment includes the other same steps as those of the manufacturing method of the first embodiment.

The honeycomb structure body molding die of the present embodiment has advantageous effects as described below.

With the honeycomb structure body molding die 1A of the present embodiment, the die main body 2A has the outer circumferential skin forming feed-bore forming region 62 placed in the area outside of the slit recess forming region 61 so as to surround the same. The outer circumferential skin forming feed-bore forming region 62 has the outer circumferential skin forming bores 32 formed in plural rows arranged in annular configurations to supply the molding material 80 for the outer circumferential skin 83 to be formed. That is, the honeycomb structure body molding die 1A of the present embodiment takes the form of a structure adapted to supply the molding material 80 only through the outer circumferential skin forming bores 32 formed in the outer circumferential skin forming feed-bore forming region 62 placed in the area outside of the slit recess forming region 61.

With the present embodiment, wholes of the outer circumferential skin forming material feed bores 32 are located on first and second common circular positions in the first and second circular rows radially spaced from the radially inward guide end 521A of the guide section 52A by the radial distances "a" and "b", respectively. During a process in which the honeycomb structure body 8 is formed, therefore, the material 80, squeezed from the outer circumferential skin forming material feed bores 32 placed on the first and second circular rows and present in the outer circumferential skin forming feed-bore forming region 62, travels in a nearly equal length in each row to reach the radially inward guide end 521A of the guide section 52A. Then, the radially inward guide end 521A of the guide section 52A turns a front end of the molding material 80 in the extruding direction ED, thereby forming the outer circumferential skin 83. That is, the material 80, supplied from the outer circumferential skin forming feed-bore forming region 62 for the formation of the outer circumferential skin 83, can be maintained in a nearly fixed volume. This enables the suppression of variation in the material 80 to be supplied for the outer circumferential skin 83 to be formed, thereby enabling the formation of the outer circumferential skin 83 with uniform thickness.

Further, the die main body 2 has the stepped section 42 that protrudes in the extruding direction as mentioned above. The stepped section 42 has the outer circumferential sidewall 421 extending from the outer circumferential slit recess forming surface 402 at an angle α expressed as 90°≦α≦95°. Therefore, during a travel of the material 80 to turn in the extruding direction in an area near the radially inward guide end 521A of the guide section 52A, the stepped section 42 is able to restrict further inward movement of the material 80 to the center of the die main body 2A, while ensuring the material 80 turns in the extruding direction. This enables the outer circumferential skin 83 to be formed in the extruding direction, while preventing the outer circumferential skin 83 and the cell walls 81, adjacent to the outer circumferential skin 83, from collapsing.

With the present embodiment, further, the relationship is established as A≦B<1.5 A wherein A represents a distance between the outer circumferential slit recess forming surface 402 and the guide section 52A and B represents a distance between the outer circumferential sidewall 421 and the radially inward guide end 521A of the guide section 52A along a direction perpendicular to the extruding direction of the material 80. The outer circumferential skin 83 is formed by the material 80 passing through the clearance 10A in the form of the distance with thickness A and passing through an area between the outer circumferential sidewall 421 of the stepped section 42 and the radially inward guide end 521A of the guide section 52A. This allows the thickness of the resulting outer circumferential skin 83 to be determined. With the distances A and B satisfying the relationship discussed above, the material 80 for forming the outer circumferential skin 83 can be almost covered with the molding material supplied through the clearance 10A between the outer circumferential slit recess forming surface 402 of the stepped section 42 and the guide section 52A. This enables the outer circumferential skin 83 to have a desired thickness in a stable manner with no occurrence of a fear of a shortage in the amount of supply of the material 80 without using excessive material 80.

With the present embodiment, furthermore, the guide section 52A of the guide ring 5A has the pool recess 54, formed in an annular shape over an entire circumference thereof, which is concaved from the opposing guide surface 520A in the extruding direction of the material so as to face the outer circumferential slit recess forming surface 402 of the slit recess section 4. Therefore, the material 80, squeezed from the outer circumferential skin forming material feed bores 32, passes through the outer-circumferential-skin molding material feed passage 11 and flows into the pool recess 54 to be accumulated (pooled) therein. Thereafter, the material 80 flows toward the center of the die main body 2A through the clearance 10 A between the outer circumferential slit recess forming surface 402 of the stepped section 42 and the guide section 52A. Then, the material 80 is guided with the guide section 52A of the guide ring 5A changes front in the extruding direction, thereby forming the outer circumferential skin 83.

That is, causing the squeezed material 80 to be pooled in the pool recess 54 once and subsequently causing the material 80 to flow to the center of the die main body 2A enables the material 80 to flow uniformly in various states (such as a flow rate, a flow speed and a flowing direction, etc.) in the course of the material traveling to the center of the die main body 2A. This results in capability of forming the outer circumferential skin 83 in excellent moldability and uniformity.

The pool recess 54 has an inner surface formed with a pool-recess slanted surface 541 having a depth gradually decreases toward the radially inward guide end 521A of the guide section 52A at an inclined angle β expressed as 10°≦β≦20°. By forming the pool-recess slanted surface 541 on the pool recess 54 so as to incline at the inclined angle β in a specified angle described above, the pool-recess slanted surface 541 can progressively pressurize the material 80 during the flowing movement of the material from the pool recess 54 to the clearance 10. Therefore, the material 80 can flow to the center of the die main body 2A under a further increased dense state, causing the dense material 80 to form the outer circumferential skin 83 with high precision.

The die main body 2A of the second embodiment has the same other advantageous features as those of the die main body 2 of the first embodiment.

While the specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention, which is to be given the full breadth of the following claims and all equivalents thereof.

What is claimed is:

1. A honeycomb structure body molding die for molding a honeycomb structure body having cells walls formed in a honeycomb shape, a large number of cells surrounded with the cells walls, and a cylindrical outer circumferential skin covering an outer circumferential sidewall, wherein the cell walls and the outer circumferential skin are unitarily formed, comprising:
   a die main body having material feed bores, through which a molding material is fed, and lattice-shaped slit recesses formed in communication with the material feed bores, respectively, for forming the molding material into a honeycomb configuration; and
   a guide ring having an upright support section extending from the die main body in an extruding direction of the molding material, and a guide section protruding inward from the upright support section with a clearance spaced from the die main body;
   wherein the die main body has a stepped section, protruding in the extruding direction of the molding material in an area radially displaced from the guide section and having a slit recess forming surface, which has a central slit recess forming surface, and an outer circumferential slit recess forming surface formed in an outside area around the stepped section;
   wherein the die main body has a feed bore closing region including a blocking member, closing the material feed bores present in the feed bore closing region to block a supply of the molding material therethrough, which is formed on the outside area around the stepped section in a region covering at least a non-opposing region in which the outer circumferential slit recess forming surface does not face the guide section; and
   wherein the die main body has a radially outward area outside the feed bore closing region formed with outer circumferential-skin forming material feed passages to feed the molding material to the clearance for forming the outer circumferential skin.

2. The honeycomb structure body molding die according to claim 1, wherein:
   the outer circumferential-skin forming material feed passages include the material feed bores and the slit recesses present in the radially outward area outside the feed bore closing region.

3. The honeycomb structure body molding die according to claim 1, wherein:

the outer circumferential-skin forming material feed passages include through bores formed in the radially outward area of the die main body at a position outside the feed bore closing region so as to extend therethrough.

4. The honeycomb structure body molding die according to claim 1, wherein:

the feed bore closing region is formed with a molding material blocking member placed on the die main body to close the material feed bores in the feed bore closing region to block the molding material from passing therethrough.

5. A honeycomb structure body molding die for molding a honeycomb structure body having cells walls formed in a honeycomb shape, a large number of cells surrounded with the cells walls, and a cylindrical outer circumferential skin covering an outer circumferential sidewall, wherein the cell walls and the outer circumferential skin are unitarily formed, comprising:

a die main body having material feed bores, through which a molding material is fed, and lattice-shaped slit recesses formed in communication with the material feed bores, respectively, for forming the molding material into a honeycomb configuration;

the die main body including a stepped section protruding in an extruding direction of the molding material and having a central slit recess forming surface formed on the stepped section formed with the slit recesses in communication with the feed bores, respectively, and an annular outer circumferential slit recess forming surface formed in an outside area around the stepped section and having the slit recesses in communication with the feed bores, respectively, wherein the stepped section has an outer circumferential sidewall;

a guide ring including an upright support section, extending from the die main body along the extruding direction of the molding material, and an annular guide section unitarily fixed to the upright support section and protruding radially inward therefrom at a position distanced from the outer circumferential slit recess forming surface of the die main body so as to provide an annular material feed path in the form of a clearance spaced from the die main body, the annular guide section having a radially inward guide end radially spaced from the outer circumferential sidewall of the stepped section by a given distance to provide a squeezing outlet through which the molding material is squeezed to form the outer circumferential skin of the honeycomb structure body; and an annular feed bore closing region, formed on the die main body, including a blocking member which closes the material feed bores present in the feed bore closing region to block a supply of the molding material therethrough and is formed on the outside area around the stepped section in a region covering at least a non-opposing region between the guide section and the stepped section in which the outer circumferential slit recess forming surface does not axially face the guide section;

wherein the die main body has an outward area formed with outer circumferential-skin forming material feed passages to feed the molding material to the squeezing outlet for forming the outer circumferential skin.

* * * * *